United States Patent [19]
McLean

[11] Patent Number: 5,915,376
[45] Date of Patent: Jun. 29, 1999

[54] EVACUATED SOLAR COLLECTOR

[76] Inventor: Vincent C. McLean, 63 Durants Park, Christ Church, Barbados

[21] Appl. No.: 08/684,749

[22] Filed: Jul. 22, 1996

Related U.S. Application Data

[60] Provisional application No. 60/011,965, Feb. 20, 1996.

[51] Int. Cl.[6] .......................................................... F24J 2/24
[52] U.S. Cl. .......................... 126/653; 126/655; 126/681; 126/698; 126/708; 126/908
[58] Field of Search ..................................... 126/648–652, 126/655, 656, 680, 681, 698, 699, 704–709

[56] References Cited

U.S. PATENT DOCUMENTS

| | | | |
|---|---|---|---|
| 2,213,894 | 9/1940 | Barry ........................................ | 126/652 |
| 3,391,688 | 7/1968 | Dery ......................................... | 126/908 |
| 3,938,497 | 2/1976 | Andrassy .................................. | 126/680 |
| 4,136,670 | 1/1979 | Davis ....................................... | 126/698 |
| 4,184,480 | 1/1980 | Kenny ...................................... | 126/704 |
| 4,191,168 | 3/1980 | Allen et al. .............................. | 126/651 |
| 4,273,098 | 6/1981 | Silverstein ............................... | 126/708 |
| 4,337,759 | 7/1982 | Popovich et al. ........................ | 126/698 |
| 4,612,914 | 9/1986 | Dogey ...................................... | 126/682 |
| 5,653,222 | 8/1997 | Newman .................................. | 126/908 |

*Primary Examiner*—James C. Yeung
*Attorney, Agent, or Firm*—Venable; Jim Burdett; Catherine A. Ferguson

[57] ABSTRACT

A solar heat collecting apparatus includes a first, inner glass dome, and a second, larger outer glass dome disposed outwardly from the inner dome. Both of the inner and outer domes have respective inner and outer surfaces and an open end, and an infrared reflective coating is adhered to the inner surface of the outer dome. A solder glass seal joins the open ends of the inner and outer domes together, thereby forming a void between said inner and outer domes. Means are provided for rechargeably forming a vacuum in the void, and an absorber plate is disposed beneath and covered by the inner and outer domes. Solar radiation entering the solar heat collecting apparatus according to the present invention is absorbed by the absorber plate, and transferred to a remote storage system by conventional heat transfer means, such as an array of conduits placed in thermal contact with the absorber plate and containing a suitable fluid.

19 Claims, 4 Drawing Sheets

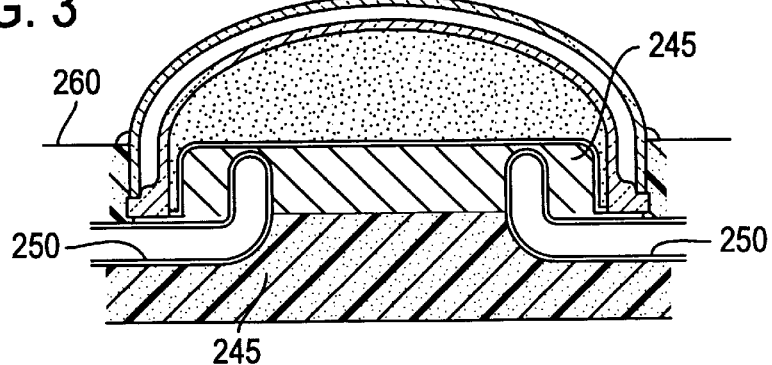
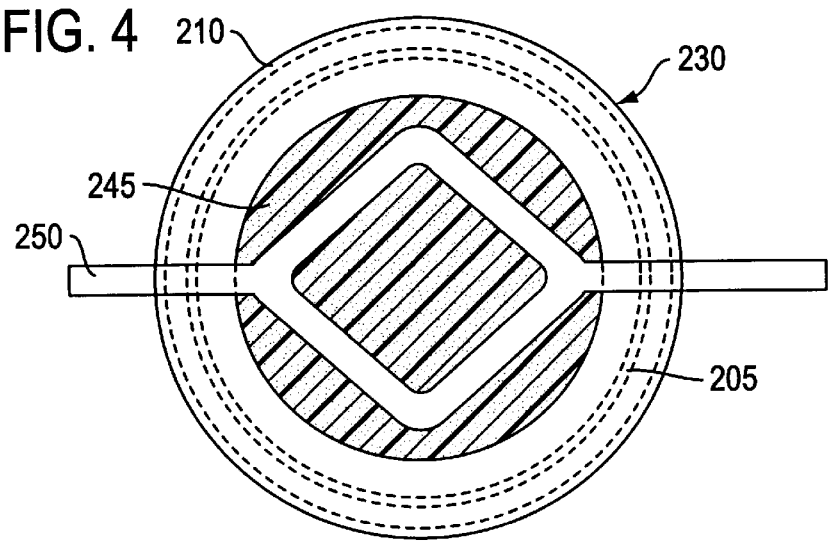
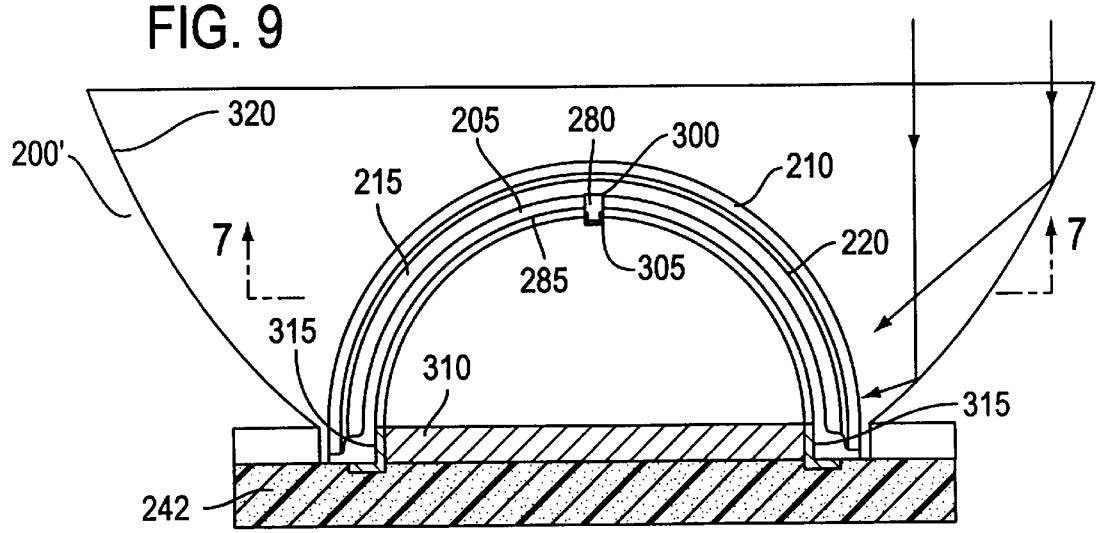

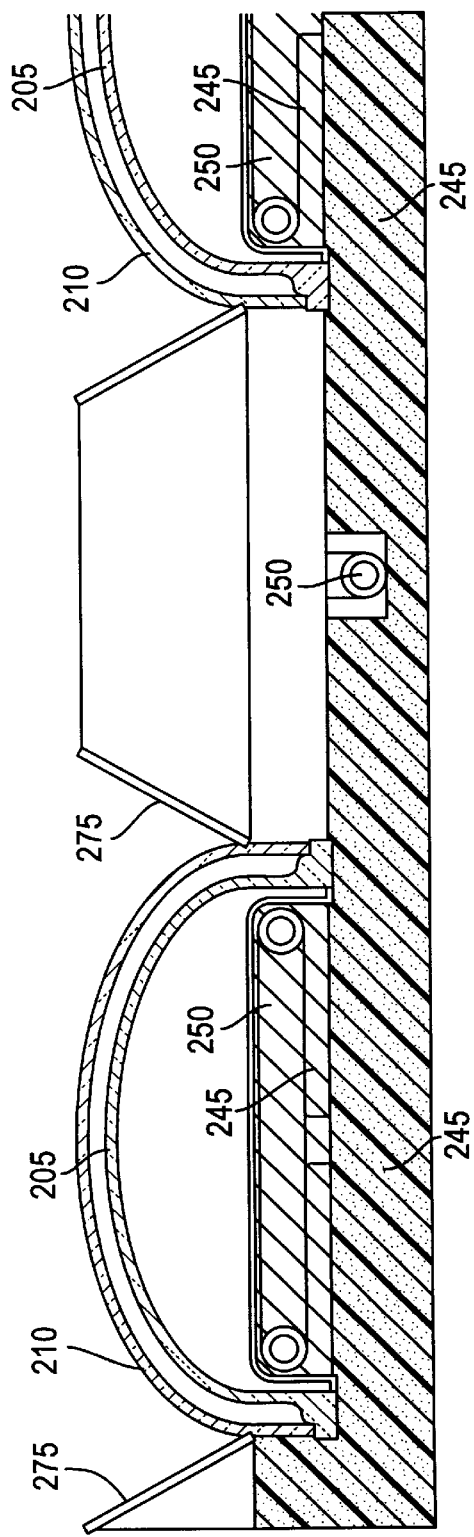
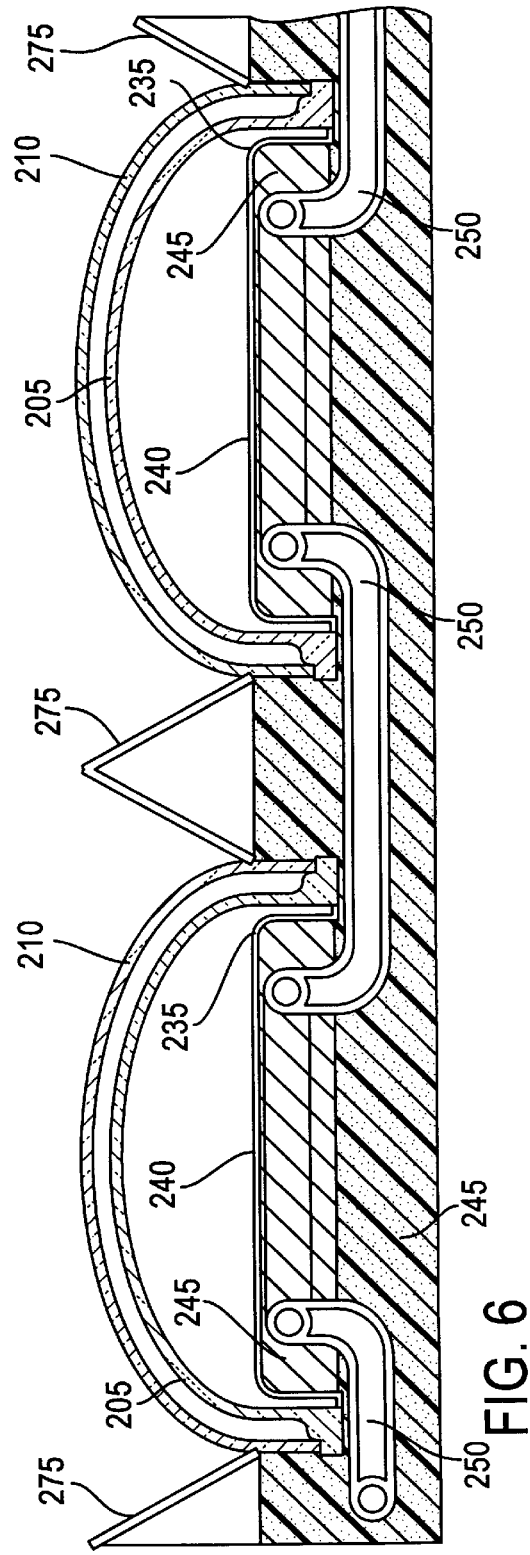

EVACUATED SOLAR COLLECTOR

CROSS-REFERENCE TO RELATED APPLICATION

The present application claims priority to a provisional patent application filed on Feb. 20, 1996 and assigned Ser. No. 60/011,965.

BACKGROUND OF THE INVENTION

1. Field of the Invention

The present invention relates generally to apparatus for collecting solar radiation, and more particularly to such apparatus for collecting solar radiation for use in glazing applications.

2. Statement of the Prior Art

There are a variety of types of solar collectors presently in use today. For low temperature applications, it has been demonstrated that the most efficient and inexpensive type of solar collector is a flat plate collector. Such collectors consist generally of an insulated box, which surrounds a flat, metal absorber plate with fluid channels and is covered by a solar radiation access window made of glass. In such well-known applications, the solar radiation enters the box through the access window, and is absorbed by the fluid contained within the channels, thereafter being transferred out of the box via the channels to a storage system.

Notwithstanding the simplicity of such flat plate collectors, they experience serious thermal losses as the temperature of the absorber plate rises. These thermal losses, as is well-known, are usually due to convective and conductive processes which occur at low temperatures, and by re-radiation losses as the temperature within the collector increases. Various strategies have been developed to counter the effects of such convective, conductive and radiation losses. However, the most useful of these strategies has been the provision of an evacuated space above the collector with an integral low emissivity coating applied to the solar access window. See, for example, U.S. Pat. No. 3,987,780 (Nazik et al.) and U.S. Pat. No. 4,579,107 (Deakin). Nevertheless, none of these strategies have been used for glazing applications in a flat plate collector.

One disadvantage occurring with such evacuated devices which are known in the prior art is that, in order to be used to produce high temperatures, they most typically are used in conjunction with parabolic solar tracking mechanisms. These tracking mechanisms are expensive, and their use with such evacuated devices made much more complex by the necessity to maintain accurate focus of the solar radiation. In other words, the evacuated devices must be placed at the focal point of the parabola and continuously maintained in alignment therewith to optimize transfer of solar radiation.

Known evacuated devices also suffer from the disadvantage that they are tubular in shape and have a very small radius of curvature. As a result, any small error in focus results in a high loss of solar radiation because the incident solar radiation will strike the evacuated tube in a nearly tangential manner.

One strategy which has been recently used by researchers in the United Kingdom and Australia to avoid such disadvantages and still provide an efficient yet inexpensive solar collector is to produce an evacuated glazing which uses two flat panes of glass that are supported by low-heat conducting materials and sealed at their edges. Such strategies, however, require either a small glazing surface or extremely thick panes of glass to withstand the stresses imposed by the vacuum.

SUMMARY OF THE INVENTION

Accordingly, it is a general object of the present invention to provide an improved solar collector.

It is a more specific object of the present invention to provide an improved solar collector which may be used in glazing applications.

Another object of the present invention is to provide a flat plate solar collector which is efficient and inexpensive, yet capable of substantially eliminating thermal losses caused by convection, conduction and re-radiation.

These and other objects, advantages, and novel features according to the present invention are provided by solar heat collecting apparatus generally comprising a first, inner glass dome, and a second, larger outer glass dome disposed outwardly from the inner dome. Both of the inner and outer domes have respective inner and outer surfaces and an open end, and an infrared reflective coating is adhered to the inner surface of the outer dome. A solder glass seal joins the open ends of the inner and outer domes together, thereby forming a void between said inner and outer domes. Means are provided for rechargeably forming a vacuum in the void, and an absorber plate is disposed beneath and covered by the inner and outer domes. Solar radiation entering the solar heat collecting apparatus according to the present invention is absorbed by the absorber plate, and transferred to a remote storage system by conventional heat transfer means, such as an array of conduits placed in thermal contact with the absorber plate and containing a suitable fluid.

In accordance with one important aspect of the present invention, the inner and outer domes are respectively comprised of an upper portion and a substantially cylindrical lower portion integrally joined to the upper portion. The upper portion may be generally hemispherically shaped, or according to a presently preferred embodiment of this invention, a semi-ellipsoid. In other words, the upper portion of the inner and outer domes is preferably formed by a shape that is obtained when an ellipse, developed by the equation $$(x^2/a^2)+(y^2/b^2)=1$$

where a and b are equal, respectively, to half the major and minor axes, is cut in half and rotated through 180° with the x-axis as the center of rotation.

During manufacture of the improved solar collector according to the present invention, an infrared reflective coating may be conveniently applied to the inner surface of the outer dome to minimize re-radiation of the solar heat collected thereby.

In accordance with yet another important aspect of the present invention, a plurality of such solar collectors may be employed in an array to form a substantially flat glazing. Such an array would be able to collect diffuse and direct solar radiation to an extent whereby it will be possible to use the array to operate absorption refrigeration systems in the summer time, and to function on clear winter days for space or water heating.

Further aspects, details and features of a presently preferred embodiment of this invention will become readily apparent from the following detailed description thereof, when considered in conjunction with the accompanying drawings wherein:

BRIEF DESCRIPTION OF THE DRAWINGS

FIG. 3 is a slightly enlarged sectional view of a single solar collector taken along the lines 3—3 shown in FIG. 1;

FIG. 4 is a plan view of the single solar collector shown in FIGS. 2 and 3;

FIG. 5 is a sectional view of a pair of solar collectors taken along the lines 5—5 in FIG. 1 greatly enlarged for the purposes of illustrating the mechanical connection therebetween;

FIG. 6 is a sectional view of a pair of solar collectors taken along the lines 6—6 in FIG. 1 greatly enlarged for the purposes of illustrating the mechanical connection therebetween;

FIG. 9 shows in sectional view the solar collector shown in FIGS. 7 and 8 as supplemented with a parabolic reflector according to the present invention.

DETAILED DESCRIPTION OF A PREFERRED EMBODIMENT

Figure 1:
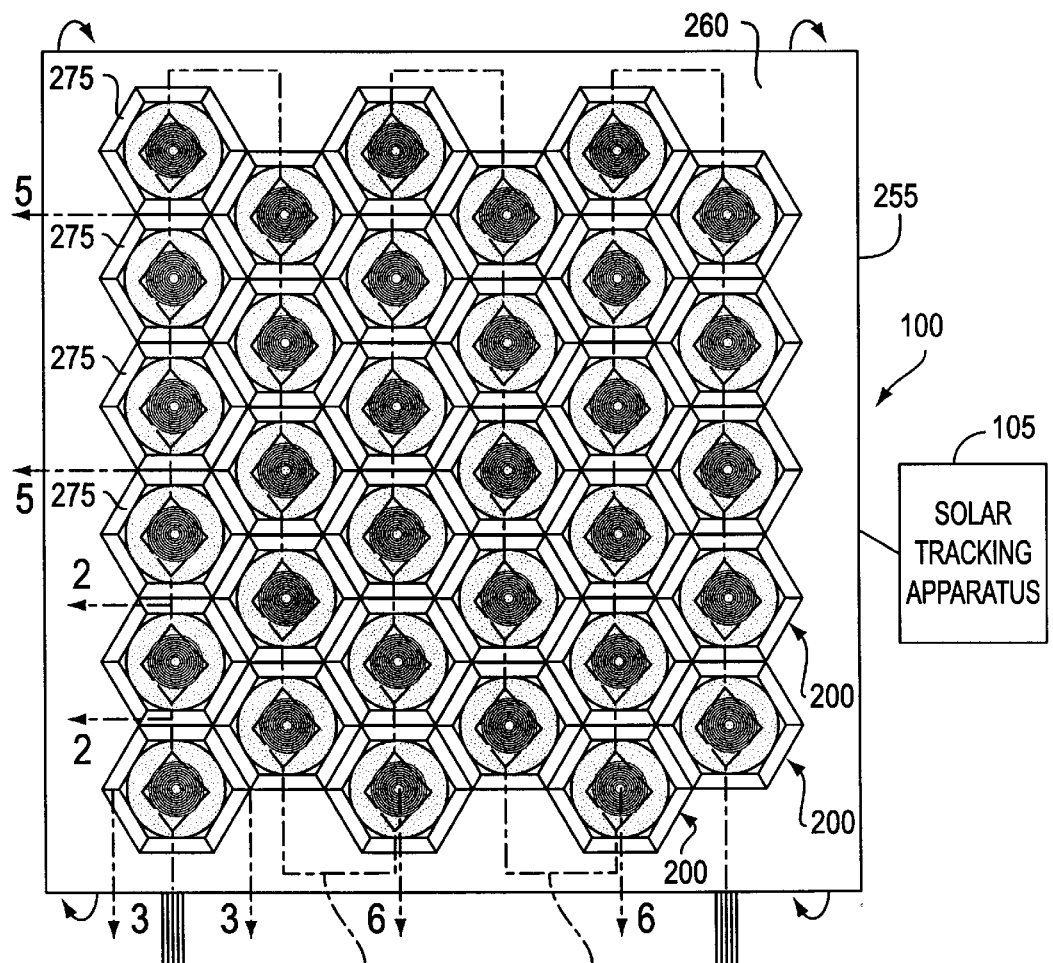
FIG. 1 shows in plan view a complete array of solar collectors according to the present invention, schematically connected together for fluid flow therethrough.
Figure 2:
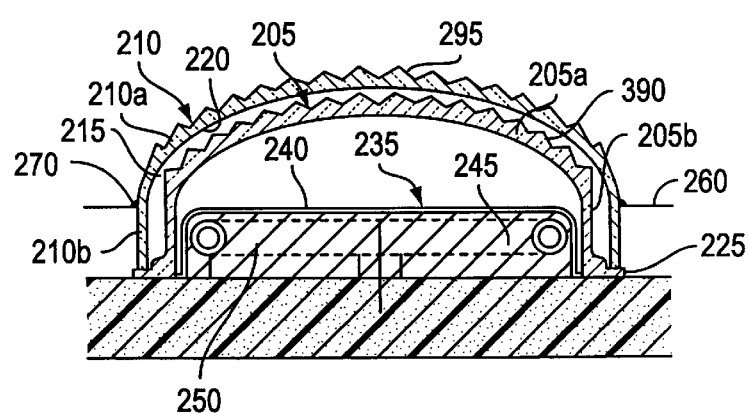
FIG. 2 is a slightly enlarged sectional view of a single solar collector taken along the lines 2—2 shown in FIG. 1.

Referring now to the drawings, wherein like characters designate like or corresponding parts throughout the several views, there is shown in FIG. 1 an array 100 of solar collectors 200 according to the present invention. Each solar collector 200, as is shown in greater detail in FIGS. 2–4, is generally comprised of a first, inner glass dome 205 which is separated from a second, outer glass dome 210 by a void 215. The inner and outer glass domes 205, 210 each consist of upper and lower portions 205a, 205b, 210a, 210b.

In order to minimize thermal losses due to re-radiation, the inner surface of the outer dome 210 has an infrared reflective coating 220 applied thereto, for example, by vapor deposition. Acceptable forms of such coatings 220 are set forth in the Nazik et al. and Deakin patents referred to herein above, the entire contents of which are incorporated by reference as if more fully set forth herein. The inner and outer glass domes 205, 210 are thereafter joined together by a solder glass circumferential seal 225, and the void 215 is evacuated to at least $10^{-4}$ Torr. An integral dome assembly 230 is thereby formed to be situated above an absorber plate enclosure 235 which is selected to maximize absorption of the heat from solar radiation collected by the dome assembly 230. Accordingly, the absorber plate enclosure 235 may be optimally comprised of any metal having a high thermal coefficient that is optionally provided with a selective coating 240. Insulation 245 is provided within the box enclosure supporting the array 100 of solar collectors 200, as well as within the absorber plate enclosure 235 which houses fluid passages 250 that are adapted to transfer the heat from each solar collector 200 as will become more apparent from the description which follows.

As can be seen with reference now to FIGS. 5 and 6 in conjunction with FIG. 1, the array 100 of such solar collectors 200 further comprises a metal box 255 which is filled with insulation 245. The array 100 of solar collectors 200 is thereafter placed within the box 255 such that the upper portions 205a project through the top of the box 255.

A plastic sheet 260 of suitable thickness and strength is used to maintain the solar collectors 200 in alignment, while a plurality of holes are formed in such plastic sheet 260 to permit the upper portions 205a to project therethrough. Suitable sealant 270 is applied along the periphery of the box 255 at its joint with the plastic sheet 260, and around the circumferential joints formed between the plurality of holes 265 and their respective solar collectors 200.

Hexagonally-shaped metallic reflectors 275 are then placed individually around each one of the solar collectors 200 in such a way that a complete honeycombed structure is formed. Such a honeycombed structure reduces the number of solar collectors 200 which may be required within a given array 100 without sacrificing its solar heat radiation collection efficiency. In climates where snow and ice may be expected, the reflectors 275 may also be coupled to a source of electric heat (not shown) in order to melt any accumulated snow or ice.

In fabricating the inner and outer domes 205, 210, certain parameters must be taken into account to ensure that the integral dome assembly 230 formed thereby is inexpensive and strong, yet highly efficient and capable of minimizing thermal losses due to convection, conduction and re-radiation. For example, it is very important to the successful implementation of the present invention to take special note of the following three parameters: (a) optical properties of the glass selected to fabricate the inner and outer domes 205, 210; (b) strength of such glass; and (c) shape of the inner and outer domes 205, 210 themselves.

Preferably, the particular glass which is selected to fabricate the inner and outer domes 205, 210 should alone permit at least 90% of the solar radiation which impacts thereon to pass therethrough. With the infrared reflective coating 220 having been applied to the inner surface of the outer dome 210, the integral dome assembly 230 should have a working efficiency of at least about 60% as the solar radiation passes through the inner and outer domes 205, 210. It has been found that borosilicate glass (e.g., Pyrex®) is such an acceptable glass, since it has the added advantages of high tensile strength and high resistance to thermal shock. An integral dome assembly 230 having a diameter of about six inches and borosilicate glass walls of about 1.5 mm thick easily withstands the hard vacuums (i.e., a vacuum of at least $10^{-4}$ Torr) and thermal stresses encountered in utilizing the solar collectors 200 according to the present invention.

As indicated previously, the shape of the inner and outer domes 205, 210 themselves is an important aspect of the present invention. It has also been found that a "semi-ellipsoid" is a particularly advantageous shape. That is, the upper portions 205a, 210a of the inner and outer domes 205, 210 are preferably formed by a shape that is obtained when an ellipse, developed by the equation $$(x^2/a^2)+(y^2/b^2)=1$$

where a and b are equal, respectively, to half the major and minor axes, is cut in half and rotated through 180° with the x-axis as the center of rotation. Alternatively, the upper portions 205a, 210a may be suitably comprised of a hemispherical shape.

Such upper portions 205a, 210a are thereafter joined in a conventional manner to their respective substantially cylindrical shaped lower portions 205b, 210b.

Figure 7:
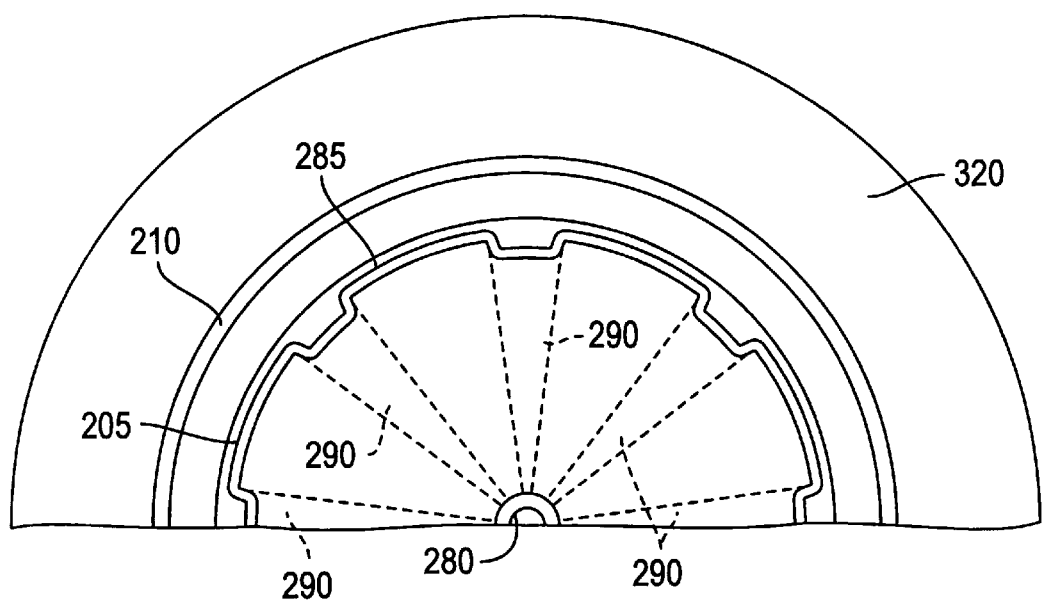
FIG. 7 shows in sectional view another solar collector according to the present invention.
Figure 8:
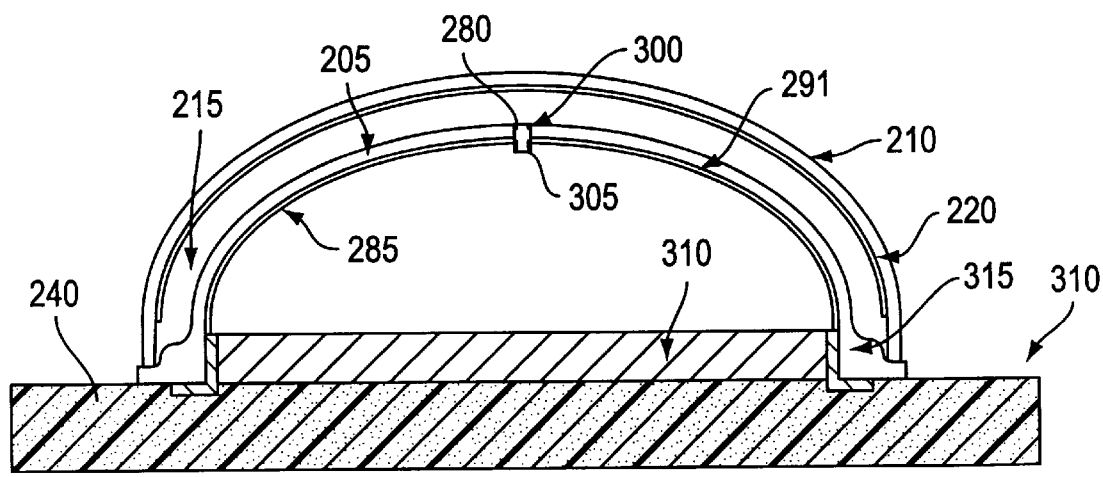
FIG. 8 is a partial cross-sectional view of the solar collector shown in FIG. 8.

Referring now to FIGS. 7–9, there is shown another, substantially larger embodiment of the present invention. Such larger versions of the solar collectors 200' formed in accordance with the present invention would be suitable for use as a solar stove.

In such an embodiment, the solar collector 200' is formed in substantially the same manner as in the smaller versions used for arrays 100 of the type described in conjunction with FIGS. 1–6. A semi-ellipsoidal outer dome 210 is pressed and the infrared reflective coating 220 applied to the inner surface of the outer dome 210 while being heated. The major axis of the ellipse from which the outer dome 210 is devolved according to this embodiment would be approximately 30 inches, while its minor axis would be approximately 20 inches.

Another similarly shaped, slightly smaller inner dome 205 with a specially shaped base (see FIG. 8) would then be pressed to include a half-inch valve hole 280 at top dead center. The dimensions and shape of such an inner dome 205 would be made to accommodate a quarter-inch void 215 between the inner and outer domes 205, 210, and the base of the outer dome 210 would be so adapted to rest on the flanged portion of the inner dome 205. As in the case of the smaller solar collectors 205 shown in FIGS. 1–6, the inner and outer domes 205, 210 would thereafter be welded together with solder glass at their points of contact.

A metallic domed absorber 285 with a selective coating 290 applied thereto would be adhesively bonded with transparent silicone adhesive to the inner dome 205. Such absorber 285 acts as a support for the inner dome 205 when a vacuum is applied, but is only necessary if the diameter of such inner dome 205 exceeds a theoretical limit of 30 inches. A plurality of flutes 290 is formed in the absorber 285 not only to allow for differences in expansion and contraction between the inner dome 205 and its absorber 285, but also to impart rigidity and strength. A vacuum valve 300 is fitted into the holes 280, 305 in the inner dome 205 and the absorber 285, and soldered in place to form the evacuation point.

At the base of the solar collector 200' is provided a selectively coated heat sink 310 of about 20 pounds of steel clad with copper. The heat sink 310 is adapted to fit inside the base of the solar collector 200', and the combination thereof sits on a pad of insulation 242 made of compressed fiberglass about 4 inches thick surrounded by a metal collar 315. A simple parabolic reflector 320 may be added to the solar collector/solar stove 200' as shown in FIG. 9. Thus, in cooking operations, the combination of the inner and outer domes 205, 210 and absorber 285 is lifted off of the metal collar 315 to enable a cooking utensil (not shown) to be placed in the space between the absorber 285 and heat sink 310.

There are a number of structural factors which must be taken into consideration when manufacturing a double-walled, spherical, evacuated solar collector 200' of such sizes as shown in FIGS. 7–9. For example, if a hard vacuum (e.g., less than or equal to $10^{-4}$ Torr) is to be used as disclosed herein, it should be readily apparent that the outer dome 210 would be subjected to compressive stresses caused by atmospheric pressure while the inner dome 205 would be subjected to tensile stresses. Hoop stresses, which may be calculated by the formula $$\Theta = PR/2t$$

where $\Theta$ is tensile stress, P is atmospheric pressure, R is the radius of the sphere, and t is the thickness of the glass used to manufacture the domes 205, 210, are present at the edges of the open ends of such domes 205, 210. This formula holds true for any cross section of the sphere, but where an ellipsoid is used, the tensile stress must be calculated using the largest radius of curvature for the value R.

Since glass is much stronger in compression, it can be shown that the outer dome can safely be constructed using 5 mm borosilicate glass for a 30" dome. On the other hand, for a glass dome of no more than 8" radius using borosilicate glass with a tensile strength of 1000 pounds per square inch (assuming a safety factor of about 7 being considered), it is seen that a glass dome having an inner wall thickness of about 1.5 mm would be more than adequate.

Obviously, many modifications and variations of the rechargeable evacuated solar collector according to the present invention are possible when viewed in light of the foregoing teachings. For example, a Fresnel lens may be formed in the inner/outer domes 205, 210 during their manufacture. As shown in FIG. 2, Fresnel lens 295 (exaggerated) is formed on outer dome 210 and Fresnel lens 390 (exaggerated) is formed on inner dome 205. Fresnel lenses, as is well know, have the effect of bending the light. Such a lens would further concentrate the collection of solar radiation and enable significantly higher temperatures. In those instances, however, it may become necessary to add conventional solar tracking apparatus 105 to facilitate focusing of the solar radiation on the Fresnel lens. It should be understood, therefore, that all such modifications and variations would be deemed to fall within the scope of the appended claims.

What I claim as my invention is:

1. Solar heat collecting apparatus, comprising:
   a first, inner glass dome having a hemispherically-shaped upper portion and a cylindrically shaped lower portion integrally joined to said upper portion wherein said upper and lower portions have the same diameter;
   a second, larger outer glass dome disposed outwardly from said inner dome having a hemispherically-shaped upper portion and a cylindrically shaped lower portion integrally joined to said upper portion wherein said upper and lower portions have the same diameter, said inner and outer domes having respective inner and outer surfaces and an open end;
   an infared reflective coating adhered to said inner surface of said outer dome;
   a solder glass seal joining together the open ends of said inner and outer domes, thereby forming a void between said inner and outer domes;
   a vacuum formed in said void;
   an absorber plate disposed beneath and covered by said inner and outer domes; and
   means for transferring heat collected by the solar heat collecting apparatus remotely therefrom.

2. Solar heat collecting apparatus, comprising:
   a first, inner glass dome having an upper portion shaped substantially as half an ellipsoid and a cylindrically shaped lower portion integrally joined to said upper portion wherein said upper and lower portions have the same diameter;
   a second, larger outer glass dome disposed outwardly from said inner dome having an upper portion shaped substantially as half an ellipsoid and a cylindrically shaped lower portion integrally joined to said upper portion wherein said upper and lower portions have the same diameter, said inner and outer domes having respective inner and outer surfaces and an open end;
   an infared reflective coating adhered to said inner surface of said outer dome;
   a solder glass seal joining together the open ends of said inner and outer domes, thereby forming a void between said inner and outer domes;
   a vacuum formed in said void;
   an absorber plate disposed beneath and covered by said inner and outer domes; and means for transferring heat collected by the solar heat collecting apparatus remotely therefrom.

3. The solar heat collecting apparatus according to claim 2, wherein said upper portion is defined by a shape that is obtained when an ellipse, developed by the equation $$(x^2/a^2)+(y^2/b^2)=1$$

where a and b are equal, respectively, to half the major and minor axes of said ellipse, is cut in half and rotated through 180° with its x-axis as the center of rotation.

4. The solar heat collecting apparatus according to claim 3, wherein the major axis is about 30 inches and the minor axis is about 20 inches.

5. A solar collection array, comprising:
  a plurality of solar collectors, each of which is formed by a first, inner glass dome and a second, larger outer glass dome disposed outwardly from said inner dome, said inner and outer domes having respective inner and outer surfaces and an open end; an infared reflective coating adhered to said inner surface of said outer dome; a solder glass seal joining together the open ends of said inner and outer domes, thereby forming a void between said inner and outer domes; and a vacuum in said void;
  a plurality of absorber plates, each of which is disposed beneath a respective one of said plurality of solar collectors;
  means for transferring heat collected by the solar heat collecting apparatus remotely therefrom; and
  reflectors placed individually around each solar collector to form a honeycombed structure.

6. The solar collector array according to claim 5, wherein said inner glass dome further comprises a Fresnel lens.

7. The solar collector array according to claim 6, further comprising solar tracking means adapted to focus solar radiation on said Fresnel lens.

8. The solar collector array according to claim 5, wherein said outer glass dome further comprises a Fresnel lens.

9. The solar collector array according to claim 8, further comprising solar tracking means adapted to focus solar radiation on said Fresnel lens.

10. The solar collector array according to claim 5, wherein said inner and outer glass domes each further comprises a Fresnel lens.

11. The solar collector array according to claim 10, further comprising solar tracking means adapted to focus solar radiation on said Fresnel lens.

12. The solar collection array according to claim 5, wherein said reflectors are metallic.

13. The solar collection array according to claim 12, wherein said reflectors are hexagonally-shaped.

14. A solar stove, comprising:
  a first, inner glass dome;
  a second, larger outer glass dome disposed outwardly from said inner dome, said inner and outer domes having respective inner and outer surfaces and an open end;
  an infrared reflective coating adhered to said inner surface of said outer dome;
  a solder glass seal joining together the open ends of said inner and outer domes, thereby forming a void between said inner and outer domes;
  an absorber disposed beneath and covered by said inner dome;
  means for rechargeably forming a vacuum in said void;
  a heat sink disposed beneath said inner and outer domes and said absorber;
  wherein each of said inner and outer domes further comprising an upper portion shaped substantially as half an ellipsoid; and
  a cylindrically-shaped lower portion integrally joined to said upper portion;
  wherein said upper and lower portions have substantially the same diameter.

15. A solar stove, comprising:
  a first, inner glass dome;
  a second, larger outer glass dome disposed outwardly from said inner dome, said inner and outer domes having respective inner and outer surfaces and an open end;
  an infrared reflective coating adhered to said inner surface of said outer dome;
  a solder glass seal joining together the open ends of said inner and outer domes, thereby forming a void between said inner and outer domes;
  an absorber disposed beneath and covered by said inner dome;
  means for rechargeably forming a vacuum in said void;
  a heat sink disposed beneath said inner and outer domes and said absorber; and
  wherein said upper portion is defined by a shape that is obtained when an ellipse, developed by the equation $$(x^2/a^2)+(y^2/b^2)=1$$

where a and b are equal, is cut in half and rotated through 180° with its x-axis as the center of rotation.

16. Solar heat collecting apparatus, comprising:
  a first, inner glass dome;
  a second, larger outer glass dome disposed outwardly from said inner dome, said inner and outer domes having respective inner and outer surfaces and an open end;
  an infrared reflective coating adhered to said inner surface of said outer dome;
  a solder glass seal joining together the open ends of said inner and outer domes, thereby forming a void between said inner and outer domes;
  a vacuum formed in said void;
  an absorber plate disposed beneath and covered by said inner and outer domes;
  means for rechargeably forming a vacuum in said void;
  means for transferring heat collected by the solar heat collecting apparatus remotely therefrom; and
  wherein said outer dome further comprises a Fresnel lens.

17. The solar heat collecting apparatus according to claim 16, further comprising solar tracking means adapted to focus solar radiation on said Fresnel lens.

18. Solar heat collecting apparatus, comprising:
  a first, inner glass dome;
  a second, larger outer glass dome disposed outwardly from said inner dome, said inner and outer domes having respective inner and outer surfaces and an open end;
  an infrared reflective coating adhered to said inner surface of said outer dome;
  a solder glass seal joining together the open ends of said inner and outer domes, thereby forming a void between said inner and outer domes;

a vacuum formed in said void;

an absorber plate disposed beneath and covered by said inner and outer domes;

means for rechargeably forming a vacuum in said void;

means for transferring heat collected by the solar heat collecting apparatus remotely therefrom; and wherein said inner and outer domes each further comprises a Fresnel lens.

19. The solar heat collecting apparatus according to claim 18, further comprising solar tracking means adapted to focus solar radiation on said Fresnel lens.

* * * * *